UNITED STATES PATENT OFFICE.

AUGUSTE J. ROSSI AND LOUIS E. BARTON, OF NIAGARA FALLS, NEW YORK, ASSIGNORS TO THE TITANIUM ALLOY MANUFACTURING COMPANY, OF NEW YORK, N. Y., A CORPORATION OF MAINE.

TITANIC-OXID-CONCENTRATE PRODUCT AND METHOD OF OBTAINING THE SAME.

1,171,542.            Specification of Letters Patent.     Patented Feb. 15, 1916.

No Drawing.      Application filed May 22, 1914. Serial No. 840,197.

*To all whom it may concern:*

Be it known that we, AUGUSTE J. ROSSI and LOUIS E. BARTON, both citizens of the United States, and residents of Niagara Falls, in the county of Niagara and State of New York, have jointly invented a certain new and useful Titanic-Oxid-Concentrate Product and Method of Obtaining the Same, of which the following is a specification.

Our present invention relates particularly to methods for deriving titanic oxid concentrates from substances containing such oxid chemically combined, or otherwise entangled with, undesired, or prohibitory, percentages of iron oxid, as for example, titaniferous iron or ilmenite, ores, and its objects comprise provision of a method, whereby, from such substances, may be obtained, at less cost, and with less waste, labor and skill, than formerly, a product or concentrate very high in titanic oxid and having distinctively novel and useful characteristics, such, for example, as exceptionally great solubility in concentrated sulfuric acid, and possessing also other properties especially adapting it for certain uses. We have discovered that by, as a preliminary step, charging and melting, together with said substances, and a reducing agent, such as carbon, the acid or neutral sulfate of an alkali metal as such, preferably a sodium sulfate, as for example, contained in the, as we believe, hitherto usually wasted by-product of the manufacture of nitric acid known as "niter cake," the which consists principally of acid sodium sulfate, *i. e.* sodium bisulfate, or the article known as "salt cake," our resulting fusion, and melt, is attended by reactions and characteristics which we believe have been prior to our invention thereof unutilized in this art, and by aid of which attainment of our said objects is facilitated and otherwise promoted.

We have, for example, successfully practised our novel method as follows:—With a titaniferous, or ilmenite, iron ore analyzing:

| | |
|---|---|
| Silica | 2.58% |
| Alumina | 4.08 |
| Iron oxid | 40.19 |
| Titanic oxid | 52.00 |
| | 98.85% | we mixed a "salt cake" of the following composition by analysis:—

| | |
|---|---|
| Sodium sulfate | 97.90 |
| Iron oxid | .21 |
| Sodium chlorid | .47 |
| Volatile (water, etc.) | 1.36 |

With the aforesaid mixture we further mixed, as the reducing agent, or carbon constituent, of our charge, petroleum coke. In this instance, we proportioned by weight the said constituents of the charge as follows, viz:—

| | |
|---|---|
| Ore | 100 lbs. |
| Salt cake | 100 lbs. |
| Petroleum coke | 30 lbs. |

The proportion of the sulfate of the alkali metal added was sufficient to insure formation of ferrous sulfid from most of the iron constituents of the ore, of titanate of the alkali metal from titanium constituents, and of alkali silicates and aluminates from silica and alumina of the gangue. The proportion of carbon added was sufficient to insure reduction of the sodium sulfate in the electric furnace hereafter referred to and it will be understood that in other types of furnaces, such as the reverberatory for example, more carbon might, owing to oxidation by furnace gases, be required. It is preferable that the carbon employed be low in ash, hence our preference for petroleum coke, though any other carbonaceous material as reducing agent might be used.

We thoroughly melted our charge as above constituted in a carbon lined electric furnace, though any other having sufficiently refractory lining and capable of developing and maintaining the required temperature, as for example a reverberatory furnace, might be employed. We believe that during our melt there was therein produced, owing to reaction of sodium sulfate with the carbon, sulfid of the alkali metal, thus:

$$Na_2SO_4 + 2C = Na_2S + 2CO_2$$

in consequence of which the following further reaction occurred predominantly, viz:—

$$FeTiO_3 + Na_2S = FeS + Na_2TiO_3$$

also to a very much less, if not unimportant, extent the following reaction, viz:—

$$2FeTiO_3 + 2Na_2SO_4 + 6C = 2Na_2FeS + Ti_2O_3 + CO + 5CO_2$$

and that, in addition to these and other reactions, silica and alumina of the ore were respectively converted to silicates and aluminates of soda.

We withdrew our resulting melt from the furnace and then cooled it. It is, we believe, of a desirable consistency and quality hitherto unattained in this art. Though it comes from the furnace as a molten slag capable of being cast and solidified into a solid mass, it is comminutable with exceptional ease, and, if crushed to only about one-quarter inch mesh will, after one or two days' exposure to the atmosphere, disintegrate into a fine powder very serviceable for our purposes. On the other hand, if so crushed immediately after cooling, its nature and consistency is such as to admit of its immediate successful use in that form in the hereafter described next following step of our process. Our said melt we boil in acid, but so diluted as to dissolve therein the iron and other compounds rather than titanic oxid. Thereby we decompose most of the sodium titanate of our melt thus releasing, without dissolving, titanic oxid, and dissolve the iron compounds, principally iron sulfid, also the silicates and aluminates, etc. We prefer to employ for this purpose dilute sulfuric acid, because of its superior economy and efficiency under the circumstances, but other acids sufficiently diluted as herein described, as for instance hydrochloric, might, though less advantageously, be employed.

The proportion of acid should in all cases be determined by analysis of the melt and need be only slightly in excess of the theoretical quantity, of sulfuric acid for example, required by the equations—

$$FeS + H_2SO_4 = FeSO_4 + H_2S$$
$$Na_2O + H_2SO_4 = Na_2SO_4 + H_2O$$

as based upon the percentages of iron sulfur compounds, and of sodium oxid, found by the analysis. For example, under ordinary conditions, a melt derived from a charge of the above-specified composition and proportions weighing say 230 lbs. will weigh about 65% thereof, i. e. about 149 lbs., and can be successfully treated with about 90%, i. e. about 135 lbs. of commercial sulfuric acid (66° B.) diluted with about seven volumes of water, or to have a slight excess, say about 140 parts of acid. The undissolved residue of the bath will be found to contain the resultant of substantially all of the titanic oxid of the ore, or substance treated, being that which settles therein after boiling has ceased. This being separated from the bath, as by decantation, or filtration, and dried, appears usually as a powdered product, and varies in color from darkish to light gray. It contains by analysis a great preponderance of titanic oxid, also, notably, a considerable percentage of soda, and some free sulfur, also sulfuric anhydrid, also comparatively unimportant quantities of silica, iron oxid, carbon and combined water. This product is of great value for several purposes because of the exceptional ease, rapidity and completeness with which it dissolves in concentrated sulfuric, and other, acids. We are, by calcining it, enabled to impart to our said product a yellowish color and slightly raise its percentage of titanic oxid without materally impairing its other distinctive characteristics such as its notable percentage of soda, also its sulfuric anhydrid say in quantity less than one per cent., and also a low percentage of iron oxid, or say not to exceed eight per cent. Analyses of specimens of our said novel titanic oxid product have indicated as its constituents, in respectively its dried, and calcined, states the following, viz:

|  | Dried. | Calcined. |
|---|---|---|
| Titanic oxid | 80.18 | 82.44 |
| Silica | 1.13 | 1.18 |
| Iron oxid | 2.83 | 2.91 |
| Alumina | Trace. | Trace. |
| Lime | None. | None. |
| Magnesia | .52 | .53 |
| Sodium oxid | 11.70 | 12.06 |
| Sulfur (free) | 1.07 | None. |
| Sulfuric anhydrid | .42 | .43 |
| Carbon | .57 | None. |
| Combined water | 1.35 | None. |

While the above analyses furnish fair and instructive examples of the composition of our said product, we find that the respective proportions of its several constituents vary more or less according to the relative proportions of the materials charged to make the melt. As the result of careful investigation we are, however, now enabled to state the limits of such variations in the dried product before calcination as follows, viz:

| | |
|---|---|
| Titanic oxid | 65% to 80% |
| Silica | 1% to 5% |
| Iron oxid | 1% to 7% |
| Sodium oxid | 2% to 15% |
| Sulfur (free) | 1% to 15% |
| Sulfuric anhydrid | 0.1% to 1% |

It will be noted that the titanic oxid of the ore, or substance, treated appears as such in our products without having at any time been in solution, the which we regard as an advantage, and its temporary combination with sodium, as in the titanate, serving only the purpose of separating effectively the titanic oxid from its natural refractory, chemical, combination with the iron oxid as in the ilmenite molecule. It will be appreciated that our said method of concentration is different, and distinct, from the heretofore suggested method by aid of fusion of titaniferous iron ores with bisulfate of soda. Without mentioning other differences, it suffices to say that in the latter such reducing agent as carbon is not employed, or relied on, and that its bisulfate operates to convert the titanium, as well as the iron, oxids into water-soluble titanium and iron sulfates.

It will be understood that potassium instead of sodium might be used as the alkali metal, and that while we prefer to preliminarily mix together the titaniferous substance, carbon, and sulfate of the alkali metal as such before charging and melting, the said mixing might, though unpreferably, be accomplished in any order, or at any stage, during our said melt; also that in lieu of mixing with the titaniferous substance carbon and sulfate of the alkali metal as such respectively, sulfid of the alkali metal preliminarily prepared by carbon reduction of its sulfate might be therefor substituted,—all without departing from our invention.

Having now described our invention, what we claim as new and desire to secure by Letters Patent is the following, viz:—

1. As a new article of manufacture, a usually powdered product darkish, to light, gray in color, or, if calcined, of a yellowish color, and distinguished, by analysis, as consisting principally of titanic oxid, as containing also sodium oxid and iron oxid, and by the exceptional ease, rapidity, and completeness with which its titanic oxid dissolves in concentrated sulfuric, and other, acids.

2. As a new article of manufacture, a usually powdered product distinguished, by analysis, as consisting principally of titanic oxid and as containing also sulfuric anhydrid.

3. As a new article of manufacture, a usually powdered product distinguished, by analysis, as consisting principally of titanic oxid and as containing also free sulfur.

4. As a new article of manufacture a powdered product distinguished by analysis as consisting principally of titanic oxid and as containing also sodium oxid, iron oxid and sulfuric anhydrid.

5. As a new article of manufacture a powdered product distinguished by analysis as consisting principally of titanic oxid and as containing also sodium oxid, iron oxid in quantity less than soda and sulfuric anhydrid in quantity less than iron oxid.

6. As a new article of manufacture a powdered product distinguished by analysis as containing titanic oxid not less than 65 per cent., sodium oxid not less than 2 per cent. iron oxid, not less than one per cent. and sulfuric anhydrid not less than 0.1 per cent.

7. In obtaining titanic oxid from a substance containing it and iron oxid the steps which consist in melting said substance in presence of sulfid of an alkali metal and boiling the resulting melt in an acid solvent of the iron and of other compounds present, but so diluted as to dissolve such iron and other, compounds rather than those of titanium.

8. In obtaining titanic oxid from a substance containing it and iron oxid the steps which consist in melting said substance in presence of carbon and sulfate of an alkali metal and boiling the resulting melt in an acid solvent of the iron and of other compounds present, but so diluted as to dissolve such iron and other, compounds rather than those of titanium.

9. In obtaining titanic oxid from a substance containing it and iron oxid the steps which consist in melting said substance in presence of sulfid of an alkali metal and boiling the resulting melt in sulfuric acid so diluted as to dissolve therein iron and other, rather than titanium, compounds.

10. In obtaining titanic oxid from a substance containing it and iron oxid the steps which consist in melting said substance in presence of carbon and a sodium sulfate and boiling the resulting melt in an acid solvent of the iron and of other compounds present, but so diluted as to dissolve such iron and other compounds, rather than those of titanium.

11. In obtaining titanic oxid from a substance containing it and iron oxid the steps which consist in melting said substance in presence of carbon and a sodium sulfate and boiling the resulting melt in sulfuric acid so diluted as to dissolve therein iron and other, rather than titanium, compounds.

12. In obtaining titanic oxid from a substance containing it and iron oxid, the steps which consist in melting such substance in presence of an oxid-reducing agent and a sodium sulfate, and in boiling the resulting melt in an acid solvent of iron compounds, but so diluted as to dissolve such compounds rather than those of titanium present.

13. As a new article of manufacture, a usually powdered product distinguished by analysis as consisting principally of titanic oxid and as containing also free sulfur and sulfuric anhydrid.

AUGUSTE J. ROSSI.
LOUIS E. BARTON.

Witnesses:
WM. O. KNOWLES,
C. J. KINZIE.